United States Patent [19]

Mueller et al.

[11] 4,277,422

[45] Jul. 7, 1981

[54] VULCANIZATION ACTIVATOR

[75] Inventors: Herbert Mueller, Frankenthal; Gerhard Paulus; Hubert Schoeppl, both of Weinheim; Emil Scharf, Ludwigshafen, all of Fed. Rep. of Germany

[73] Assignee: BASF Aktiengesellschaft, Fed. Rep. of Germany

[21] Appl. No.: 36,861

[22] Filed: May 7, 1979

Related U.S. Application Data

[63] Continuation of Ser. No. 834,413, Sep. 19, 1977, abandoned.

[30] Foreign Application Priority Data

Oct. 7, 1976 [DE] Fed. Rep. of Germany ....... 2645170

[51] Int. Cl.$^3$ .............................................. C08C 19/20
[52] U.S. Cl. ........................................ 260/791; 260/3; 260/784; 525/333; 525/334; 525/335; 525/336
[58] Field of Search .................... 260/3, 79.5 P, 852, 260/791, 784; 525/333, 334, 335, 336

[56] References Cited

U.S. PATENT DOCUMENTS

| | | | |
|---|---|---|---|
| 1,592,820 | 7/1926 | Cadwell | 260/796 |
| 1,780,326 | 11/1930 | Williams et al. | 260/796 |
| 1,809,454 | 6/1931 | Sebrell | 260/796 |
| 1,840,932 | 1/1932 | Cadwell | 260/796 |
| 1,885,509 | 11/1932 | Byers | 260/796 |
| 2,120,547 | 6/1938 | Clifford | 260/796 |
| 2,129,615 | 9/1938 | Calvert | 260/796 |

FOREIGN PATENT DOCUMENTS 457285 11/1936 United Kingdom .

OTHER PUBLICATIONS

*Makromoleculare Chemie,* by Krässig, vol. 17, 1955, p. 112.

*Primary Examiner*—Theodore E. Pertilla
*Attorney, Agent, or Firm*—Keil & Witherspoon

[57] ABSTRACT

A vulcanization activator which comprises a condensation product of ethylenediamine or propylenediamine with a low molecular weight aldehyde.

9 Claims, No Drawings

VULCANIZATION ACTIVATOR

This is a continuation of application Ser. No. 834,413 filed Sept. 19, 1977 now abandoned.

The present invention relates to the use of cyclic bisaminomethane compounds, obtained from aldehydes and diamines, for vulcanizing rubber.

It is well known that one of the most important stages of processing rubber is vulcanization with sulfur, during which the rubber is converted from the thermoplastic to the highly elastic state and acquires other physical properties, especially better tensile strength, elongation at break, resilience, abrasion resistance and hardness, and better solvent resistance. A review of the prior art is to be found, for example, in the following book: Alliger and Sjothun, *Vulcanization of Elastomers* (Reinhold, N.Y., 1964).

The reaction of rubber with the vulcanizing agent, as a rule sulfur, follows a certain time pattern, depending on the operating conditions and the composition of the vulcanization mixture, during which time the properties develop, reach their best values during an optimum stage, and decline again on continued vulcanization, ie. overvulcanization. It is therefore desirable that the optimum stage should be very largely insensitive to fluctuations in vulcanization conditions, ie. that there should be a broad vulcanization plateau.

For industrial vulcanization processes, in particular, it is not only reliable operation which is important but also the constancy of the optimum achievable properties, ie. constancy from article to article in mass production, and constancy from one part to another of a particularly large article.

The vulcanization time and vulcanization temperature can be influenced by adding vulcanization activators, for example vulcanization accelerators, to the vulcanization mixture, and by selecting an appropriate composition of the mixture.

Examples of conventional vulcanization accelerators are diphenylguanidine, hexamethylenetetramine, diaminodiphenylmethane, alkylthiurams, di-ortho-tolylguanidine, dithiocarbamates and sulfinamides; these are described in the following book: Dr. Werner Hofmann "*Vulkanisation und Vulkanisationshilfsmittel*", Berliner Unionsverlag 1965.

The conventional vulcanization accelerators or, in more general terms, vulcanization activators, possess, as can be seen from the above, not only technical disadvantages but in some cases also economic disadvantages, so that there remains a need for novel, inexpensive and universally applicable and advantageous vulcanization activators.

It is an object of the present invention to provide new vulcanization activators which enrich the art.

We have found that this object is achieved by providing reaction products of a diamine, preferably an aliphatic 1,2- or 1,3-diamine or o-phenylenediamine, with an aldehyde, preferably a low molecular weight aldehyde, and that rubber may be advantageously vulcanized in the presence of these vulcanization accelerators.

For the purposes of the invention, aliphatic 1,2- and 1,3-diamines are essentially ethylenediamine, 1,2-propylenediamine and 1,3-propylenediamine. It is true that in a broader sense their alkyl-, aralkyl- and aryl-substitution products may also be used; however, these are less relevant, for economic reasons, though they are effective for the purposes of the invention. Examples of such diamines are 1,2- and 1,3-butylenediamine, 2,2-dimethyl-1,3-propylenediamine, 1-phenyl-1,3-propylenediamine (obtainable from aniline and acrylonitrile) and 1,2-diphenyl-1,2-ethylenediamine.

The aldehydes capable of reaction, ie. condensation, which are used are, for economic reasons, in the main formaldehyde, acetaldehyde, n- or i-butyraldehyde and under certain circumstances also benzaldehyde. Aldehydes of 1 to 8 carbon atoms are suitable in principle, those of 1 to 4 carbon atoms being preferred.

The reaction products are formed in the conventional manner, in general spontaneously. It is believed that the reaction products under consideration are cyclic condensation products, the two amino groups of one amine molecule having been condensed with the oxo group of the aldehyde, as described, for example, in "Makromolekulare Chemie" 17 (1955), 77 et seq., which is hereby incorporated as a reference. The compounds are formed spontaneously on mixing the diamines with the aldehydes in the stoichiometric molar ratio of 1:2. On removing water, for example by distillation under reduced pressure, the compounds are frequently obtained in a crystalline form.

The vulcanization accelerators or activators will normally be present in mixtures in amounts of from 0.1 to 5, preferably from 0.2 to 4%, by weight based on the rubber.

The compounds according to the invention are preferably employed when processing natural rubber; however, they can also be used for the vulcanization of synthetic rubbers, eg. acrylonitrile, butadiene and isoprene homopolymers and copolymers, ethylene-propylene copolymers and butyl rubbers.

In addition to vulcanization accelerators the rubber mixtures as a rule principally contain the vulcanizing agent, ie. sulfur or a sulfur donor having a similar effect, and other rubber auxiliaries and vulcanization activators. These include, for example, fillers, eg. carbon black, white reinforcing fillers (eg. active silica) or inactive fillers, eg. chalk and talc, plasticizers, eg. paraffin oil or naphthenic or aromatic mineral oils, activators, eg. zinc oxide or stearic acid, blowing agents, fire-retarding agents and agents for reducing odor, and the like. The agents according to the invention can be used conjointly with other vulcanization accelerators, activators, retarders, aging inhibitors and fatigue retarders.

Using the invention, rubber can be vulcanized simply and economically, over a wide range of working conditions, and for the purpose of manufacturing a wide range of rubber goods. The invention has the effect of accelerating the vulcanization whilst fluctuations in vulcanization time or temperature over a relatively broader range than that permitted in the prior art have little or no effect on the properties of the vulcanized products.

The mixtures manufactured using the agents according to the invention can be stored unvulcanized for a fairly long time at below 100° C. They can be processed by compression molding or extrusion at up to 250° C.

Rubber mixtures prepared according to this invention can be vulcanized in the conventional manner. For example, a mixture of rubber, sulfur and the agent according to the invention, with or without plasticizers, activators, fillers or other assistants, is vulcanized for from about 5 to 90 minutes at from 110° to 180° C. in a heated press, after which the vulcanized product is taken out of the press and used further.

The vulcanized products obtained are particularly suitable for rubber goods based on natural rubber or synthetic rubbers. Examples include moldings, eg. automotive tires, gaskets, sleeves, extruded articles such as profiles and hoses, as well as roller coverings, conveyor belts, hard rubber goods or apparatus linings.

In the Examples, parts are by weight.

EXAMPLES

A natural rubber mixture was prepared from
smoked sheets: 100 parts
HAF carbon black: 40 parts
RS zinc oxide: 5 parts
stearic acid: 1.5 parts
sulfur: 2.5 parts The vulcanization accelerator A employed was a crystalline compound believed to be cyclic bis-methylene-di-tetrahydroimidazole, of melting point 214°–217° C.; the compound was prepared by condensing 2 moles of ethylenediamine with 4 moles of formaldehyde at 30° C. The crystalline product was obtained by evaporating the solution under reduced pressure, and was recrystallized from benzene.

The vulcanization accelerator B employed was also an assumed cyclic bis-methylene-di-tetrahydroimidazole, this being obtained by condensing ethylenediamine and formaldehyde in the molar ratio of 1:2 at from 80° to 90° C. On concentrating this solution, a liquid product, apparently isomeric with the above accelerator A, is obtained.

The vulcanization accelerator C employed was a compound which was synthesized by the method described by H. Krässig in "Die Makromolekulare Chemie", 17 (1955/56), 77, and which is stated in the said publication to be a cyclic tetramethylene-tetrahexahydropyrimidine. It can be obtained by reacting 1,3-propylenediamine and formaldehyde in the molar ratio of 1:2 at from 20° to 50° C.

Cyclohexylbenzothiazyl-sulfenamide, commercially available under the name "Vulkacit CZ", was employed as a conventional vulcanization accelerator. Diphenylguanidine, known as "Vulkacit D", was employed an another vulcanization accelerator. In each case, 1 part of an accelerator was added to the test mixture described above. The two conventional accelerators are referred to below as D and E, respectively.

1. Tests

The following experiments were carried out with these mixtures:

(a) Prevulcanization characteristics and Mooney plasticity at 120° C.
(b) Vulcameter tests at 140°, 160° and 180° C.
(c) Mechanical properties of the vulcanized products at 143° and 164° C.
(d) Heat aging for 48 and 100 hours at 100° C. and
(e) De Mattia dynamic fatigue.

2. Results 2.1 Prevulcanization and Mooney plasticity at 120° C.

|   | $t_5$ | $V_{30}$ | ML-4 |
|---|---|---|---|
| A | 12.0 | 7.3 | 56 |
| B | 8.2 | 9.7 | 58 |
| C | 8.1 | 11.5 | 56 |
| Comparison (D) | 36.3 | 7.5 | 47 |
| Comparison (E) | 13.5 | 4.1 | 51 |

$t_5$ = Prevulcanizaton time (min)
$V_{30}$ = Prevulcanization rate after $t_5$ ( $\frac{\text{Mooney units}}{\text{min}}$ )
ML-4 = Plasticity after 4 minutes (Mooney units)

2.2 Vulcameter test (Bayer vulcameter)

| Prevulcanization | | Maximum shearing force kp | Start of reversion min | Angle of slope of the vulcanization curve degrees |
|---|---|---|---|---|
| 10% min | 90% min | | | |
| (a) at 140° C. | | | | |
| A  3.9 | 43.9 | 1.89 | —ˣ | 35 |
| B  2.5 | 43.0 | 2.00 | —ˣ | 42 |
| C  2.3 | 39.1 | 2.50 | —ˣ | 54 |
| D  10.2 | 21.5 | 2.75 | 43 | 72 |
| E  4.2 | 61.5 | 1.84 | —ˣ | 28 |
| (b) at 160° C. | | | | |
| A  1.0 | 9.8 | 2.12 | 22.5 | 74 |
| B  1.0 | 10.2 | 2.30 | 23.5 | 77 |
| C  1.0 | 8.0 | 2.64 | 19.0 | 82 |
| D  2.8 | 5.5 | 2.59 | 12.0 | 85 |
| E  1.5 | 12.5 | 2.05 | 28.5 | 65 |

ˣ = reversion not yet reached after 80 minutes 2.3 Mechanical properties of the vulcanized products (the data relate to the vulcanization optimum)

|   | A | B | C | D | E |
|---|---|---|---|---|---|
| Vulcanization data, min/°C. | 40/143 | 40/143 | 40/143 | 20/143 | 60/143 |
| Elongation at 300%, kp/cm² | 95 | 98 | 121 | 140 | 95 |
| Tensile strength, kp/cm² | 234 | 259 | 272 | 283 | 234 |
| Elongation at break, % | 538 | 570 | 538 | 517 | 550 |
| Elasticity, % | 50 | 50 | 53 | 51 | 48 |
| Hardness, °Shore A | 55 | 56 | 60 | 62 | 55 |
| Vulcanization data, min/°C. | 10/160 | 10/160 | 10/160 | 6/160 | 13/160 |
| Elongation at 300%, kp/cm² | 83 | 83 | 103 | 111 | 75 |
| Tensile strength, kp/cm² | 257 | 255 | 275 | 297 | 227 |
| Elongation at break, % | 582 | 570 | 580 | 546 | 570 |
| Elasticity, % | 50 | 50 | 53 | 50 | 48 |
| Hardness, °Shore A | 54 | 53 | 57 | 58 | 51 |

2.4 Heat aging
Residual values in % of the values given in 2.3 (vulcanization carried out at 143° C.; aging for 48 hours at 100° C.)

|   | A | B | C | D | E |
|---|---|---|---|---|---|
| Elongation at 300% | (88)ˣ | 91 | (87)ˣ | (107)ˣ | 76 |
| Tensile strength | 32 | 33 | 34 | 37 | 31 |
| Elongation at break | 51 | 55 | 52 | 45 | 56 |
| Hardness | 102 | 100 | 100 | 102 | 96 |

ˣ = the values shown in brackets were extrapolated.
Aging for 100 hours at 100° C.

|   | A | B | C | D | E |
|---|---|---|---|---|---|
| Elongation at 300% | (58)ˣ | (63)ˣ | (54)ˣ | (64)ˣ | (61)ˣ |
| Tensile strength | 13 | 12 | 12 | 13 | 11 |
| Elongation at break | 31 | 11 | 31 | 28 | 29 |
| Hardness | 95 | 95 | 93 | 97 | 96 |

ˣ = the values in brackets were extrapolated.

2.5 De Mattia dynamic fatigue
The following values were obtained:

|   | Start of crack formation (× 10³ cycles) | Sample fractured (× 10³ cycles) |
|---|---|---|
| A | 10 | 60 |
| B | 10 | 60 |
| C | 10 | 55 |
| D | 10 | 40 |
| E | 10 | 60 |

Results similar to those with accelerators A, B and C are obtained if these are replaced by corresponding condensation products prepared from
(1) 1,2-Propylenediamine and n-butyraldehyde in the molar ratio of 1:2.

(2) Hexamethylenediamine and isobutyraldehyde in the molar ratio of 1:2.
(3) o-Phenylenediamine and isobutyraldehyde in the molar ratio of 1:2.
(4) Ethylenediamine and acetaldehyde in the molar ratio of 1:2.

Summary of results

We have found that the properties of the rubbers vulcanized according to the invention are at least equal to those of the conventionally vulcanized rubbers.

We claim:

1. A process for the manufacture of vulcanized rubber, comprising:
   adding a vulcanizing agent and one or more vulcanizing activators, said activators containing the crystalline reaction product of formaldehyde and 1,3-propylene diamine, to the rubber, and
   heating the mixture.

2. A process as set forth in claim 1, wherein said vulcanizing activator comprising the crystalline reaction product of formaldehyde and 1,3-propylene diamine is formed by mixing 1,3-propylene diamine and formaldehyde in aqueous solution in a molar ratio of 1:2 to effect spontaneous reaction, and removing water to obtain the crystalline reaction product.

3. A process as set forth in claim 2, wherein said water is removed by distillation under reduced pressure.

4. A process as set forth in claim 1, wherein said crystalline reaction product is cyclic tetramethylene-tetrahexahydropyrimidine.

5. A process as set forth in claim 1, wherein from 0.1% to 5.0% by weight of the activator is added based on the weight of the rubber.

6. A process as set forth in claim 4, wherein from 0.1% to 5.0% by weight of the activator is added based on the weight of the rubber.

7. Vulcanized rubber made by the process of claim 1.
8. Vulcanized rubber made by the process of claim 2.
9. Vulcanized rubber made by the process of claim 4.

* * * * *